Oct. 23, 1923.

A. SOSS 1,471,577

AUXILIARY CLUTCH FOR MOTOR VEHICLES

Filed Dec. 3, 1921  2 Sheets-Sheet 1

Inventor:
Arthur Soss.

By
Attorneys.

Oct. 23, 1923.  1,471,577
A. SOSS
AUXILIARY CLUTCH FOR MOTOR VEHICLES
Filed Dec. 3, 1921   2 Sheets-Sheet 2
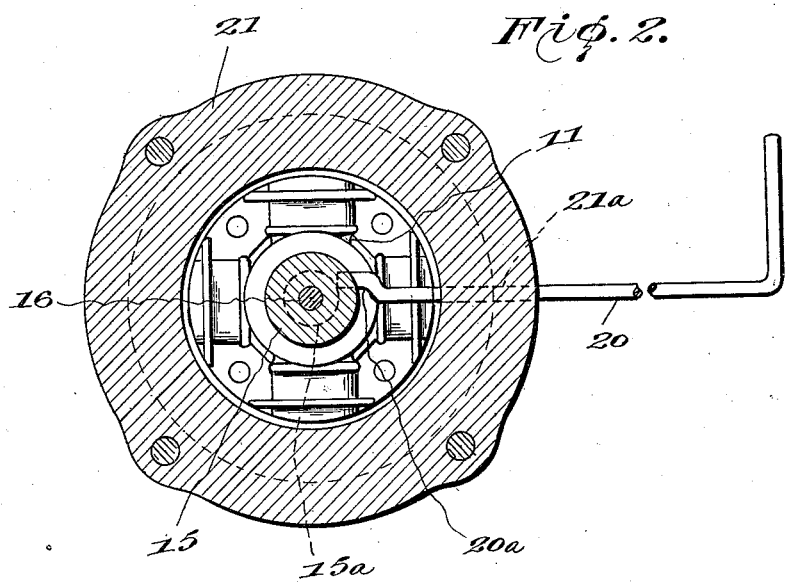
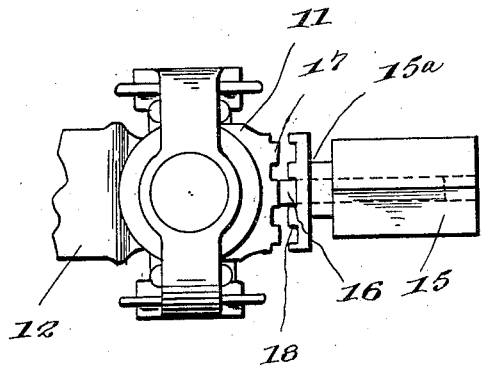
Inventor
Arthur Soss.
By
Attorneys Patented Oct. 23, 1923.

1,471,577

UNITED STATES PATENT OFFICE.

ARTHUR SOSS, OF UTICA, NEBRASKA.

AUXILIARY CLUTCH FOR MOTOR VEHICLES.

Application filed December 3, 1921. Serial No. 519,701.

*To all whom it may concern:*

Be it known that I, ARTHUR SOSS, a citizen of the United States, residing at Utica, in the county of Seward, and State of Nebraska, have invented new and useful Improvements in Auxiliary Clutches for Motor Vehicles, of which the following is a specification.

This invention has for its object to provide a means for facilitating the starting of automobile motors, and especially where the motor is not provided with a self-starter but must be started manually. The invention has been designed more particularly for application to motor vehicles employing a planetary transmission mechanism and a multiple-disk clutch. It is usually exceedingly difficult to start the motor in cold weather, due to the drag between the clutch plates occasioned by the more or less congealed oil therebetween, and hence it is a common practice to jack up the rear end of the car so as to leave one or both of the rear wheels clear of the ground, and then with the clutch engaged, it is usually not difficult to spin the motor sufficiently fast enough to obtain a start. The invention therefore aims to permit cranking of the motor with the clutch engaged, and without the necessity of jacking up the car to take the rear wheels off the ground. This is accomplished by providing an auxiliary clutch which can be set to positively disconnect the drive shaft from the motor, so that the motor may now be cranked with the main clutch engaged.

In order that the invention may be better understood, reference is had to the accompanying drawing, wherein:

Fig. 2 is a cross section on the line 2—2 of Fig. 1, and

Fig. 3 is an elevation of a universal joint and a clutch associated therewith.

Figure 1:
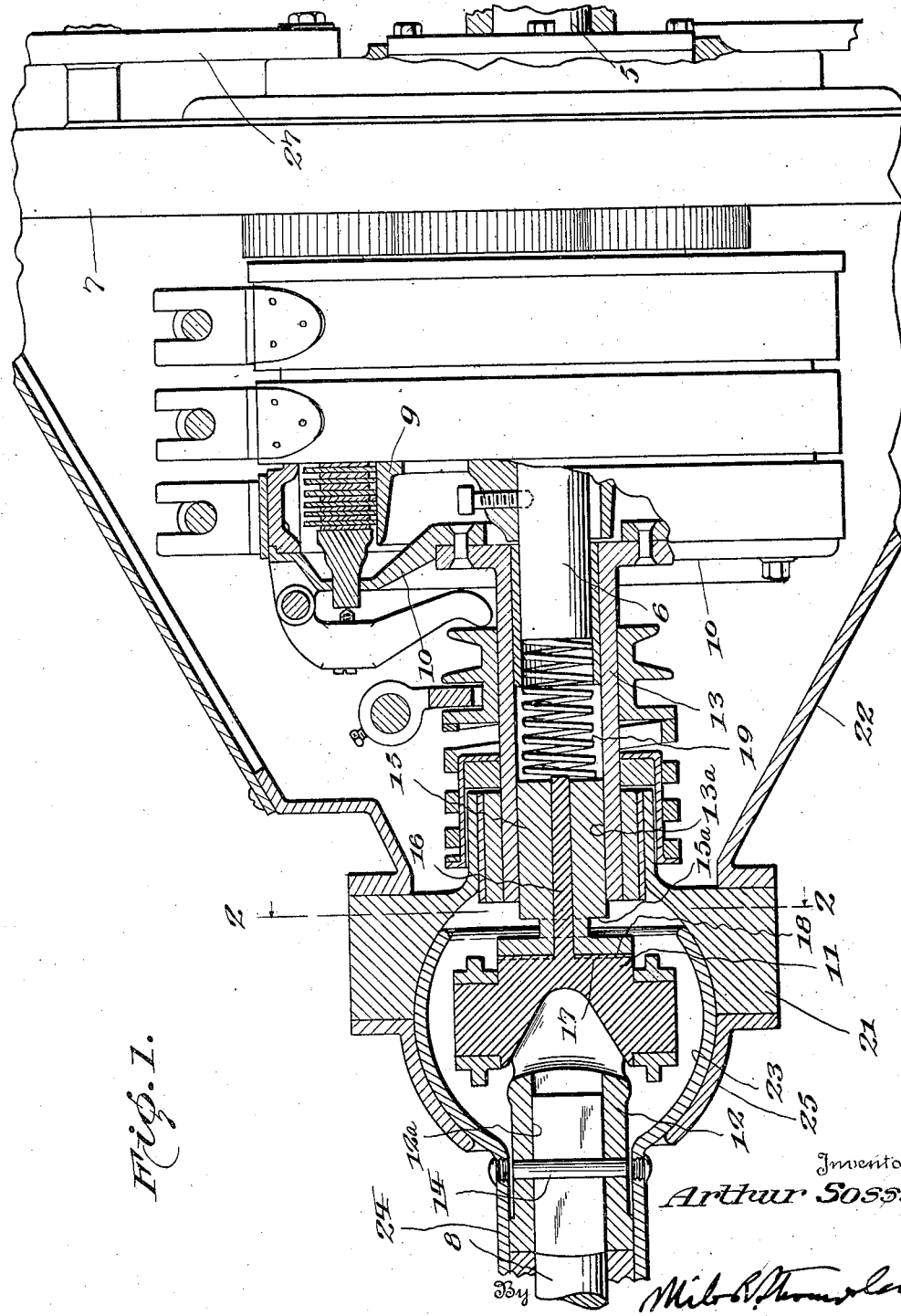
Figure 1 is a longitudinal section showing the application of the invention.

Referring specifically to the drawing, 5 denotes a fragment of the engine crank shaft provided with an extension 6 beyond the fly-wheel 7, said extension carrying the assembly of drums and gears of the planetary transmission mechanism. This mechanism includes a clutch whereby a direct driving connection is obtained between the crank shaft 5 and the propeller shaft 8 which is geared to the rear axle of the car. The clutch is of the usual multiple-disk type, one set of disks being carried by a drum 9 made fast to the shaft extension 6, and the other set having a connection with a driving plate 10, said plate, in turn having a driving connection with the propeller shaft 8. The mechanism illustrated represents a typical planetary transmission and a detailed description thereof is not deemed necessary. The drum 9 and its disks comprise the driving member of the clutch, and the plate 10 and the disks associated therewith may be termed the driven member of the clutch.

At 11 and 12 are shown the two knuckle members of the universal joint which is interposed in the driving system to permit rotation of the propeller or drive shaft 8 even though the latter is at an angle with the engine crank shaft 5. In the planetary transmission illustrated, the driving plate 10 of the clutch assembly is fitted with a short shaft 13 having a square axial socket 13$^a$ in its rear end in which fits the stem of the forward or male joint knuckle 11. The rear or female knuckle 12 of the universal joint has its stem provided with a square socket 12$^a$ in which fits the forward squared end of the propeller or drive shaft 8, said shaft being secured by a cross pin 14.

The universal joint assembly thus far described does not differ from that used in connection with the transmission mechanism illustrated, except that the member 11 is made in two parts which are adapted to be coupled together and uncoupled. For this purpose, the member 11 is made in the form of a yoke as usual but has its stem 15 separate, the same being slidably mounted on a guide stem 16 extending from the yoke, the stem 15 having a central longitudinal bore in which the stem 16 seats. The back of the yoke has clutch jaws 17, and the opposite or rear end of the slidable stem 15 has matching clutch jaws 18. It will therefore be seen that when the clutch jaws 17 and 18 are interlocked, the stem 15 is locked to the yoke, and the two sections of the joint member 11 rotate as one, whereas when the clutch jaws are disengaged, the two sections are disconnected and the stem 15 turns freely on stem 16 without transmitting motion to the yoke portion of the joint member 11.

The stem 15 extends into and is thus coupled to the shaft 13, and in the socket 13$^a$ of said shaft is a coiled spring 19 engaging the forward end of the stem for urging the same in a direction to engage its clutch jaws 17 with the clutch jaws 18. The stem 15 is operated by a shifter 20.

The universal joint is enclosed in a housing as usual. One of the halves 21 of this housing is mounted on the rear end of the transmission housing 22 and is made somewhat longer in view of the added length of the joint. The forward ball end 23 of the drive shaft tubing 24 seats in the joint housing and is held by the rear half 25 thereof. The added length of the housing section 21 places the rear axle assembly farther back a corresponding distance, which necessitates that the usual rear spring hangers be replaced by hangers having a rearward offset a distance corresponding to the distance the rear axle assembly is shifted rearwardly.

The clutch-shifter 20 passes through a hole 21ª in the housing section 21 to the outside thereof so that it may be grasped for engaging and disengaging the clutch. The spring 19 also prevents rattling of the parts and its forward pressure against the crank extension shaft 6 tends to keep the fly-wheel 7 from backing away from the magneto coils, and hence the proper spacing between the coils and the magnets 27 on the fly-wheel is maintained at all times.

Where it is desired to start the car, the clutch shifter 20 is operated to slide the stem 15 forwardly and thus disengage its jaws 18 from the jaws 17. This breaks the driving connection between the shafts 13 and 8 through the universal joint, and hence the motor may be cranked with the main or transmission clutch engaged, and without any motion being transmitted to the shaft 8. After the motor has started, the main clutch is placed in neutral position, and the shifter 20 is then operated to slide the stem 15 rearwardly to reengage its jaws 18 with the jaws 17. The driving connection between shafts 13 and 8 is now reestablished, and the car may be started in the usual way.

The shifter 20 is a rod having an offset or eccentric inner end portion 20ª which seats in a groove 15ª in the stem 15, so that a rotary movement of the rod shifts the stem as hereinbefore described.

I claim:

1. The combination with the drive shaft of a motor vehicle, and a driving shaft therefor; of a universal joint connecting said shafts, one of the members of said joint having clutch jaws and a projecting stem, a stem slidably mounted on said stem and provided with matching clutch jaws, said slidable stem being connected to and driven by the driving shaft, and means for shifting said slidable stem to engage and disengage the clutch jaws.

2. The combination with the drive shaft of a motor vehicle, and a driving shaft therefor; of a universal joint connecting said shafts, one of the members of said joint having clutch jaws and a slidable part provided with matching clutch jaws, said slidable part being connected to and driven by the driving shaft, and the joint member which is provided with the clutch jaws having a guide stem on which the slidable part is mounted, and means for shifting said slidable part to engage and disengage the clutch jaws.

In testimony whereof I affix my signature.

ARTHUR SOSS.